US012621065B2

(12) United States Patent
Chi

(10) Patent No.: US 12,621,065 B2
(45) Date of Patent: May 5, 2026

(54) COMMUNICATION METHOD AND APPARATUS

(71) Applicant: BEIJING XIAOMI MOBILE SOFTWARE CO., LTD., Beijing (CN)

(72) Inventor: Liangang Chi, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 330 days.

(21) Appl. No.: 18/569,164

(22) PCT Filed: Jun. 17, 2021

(86) PCT No.: PCT/CN2021/100744
§ 371 (c)(1),
(2) Date: Dec. 11, 2023

(87) PCT Pub. No.: WO2022/261915
PCT Pub. Date: Dec. 22, 2022

(65) Prior Publication Data
US 2024/0275508 A1     Aug. 15, 2024

(51) Int. Cl.
*H04B 17/00* (2015.01)
*H04B 17/345* (2015.01)
*H04W 24/10* (2009.01)

(52) U.S. Cl.
CPC .......... *H04B 17/345* (2015.01); *H04W 24/10* (2013.01)

(58) Field of Classification Search
CPC .... H04B 17/345; H04W 24/10; H04W 24/08; H04L 5/005; H04L 5/0092; H04L 5/14
See application file for complete search history.

(56) References Cited

U.S. PATENT DOCUMENTS

| | | | |
|---|---|---|---|
| 12,489,498 B1* | 12/2025 | Raghavan | H04B 7/0691 |
| 2020/0145153 A1 | 5/2020 | Ma et al. | |
| 2021/0321415 A1* | 10/2021 | Raghavan | H04W 72/0453 |
| 2022/0007395 A1* | 1/2022 | Lei | H04L 1/0003 |
| 2022/0255647 A1* | 8/2022 | Sahraei | H04W 72/0446 |
| 2023/0086445 A1* | 3/2023 | Zhang | H04L 5/14 370/277 |
| 2023/0179278 A1* | 6/2023 | Zhou | H04B 7/0639 370/329 |

(Continued)

FOREIGN PATENT DOCUMENTS

| | | |
|---|---|---|
| CN | 108934188 A | 12/2018 |
| CN | 109088683 A | 12/2018 |

(Continued)

OTHER PUBLICATIONS

PCT/CN2021/100744 International Search Report dated Mar. 18, 2022, 4 pages.

(Continued)

*Primary Examiner* — Faruk Hamza
(74) *Attorney, Agent, or Firm* — Cozen O'Connor

(57) ABSTRACT

A communication method performed by a network device comprises: sending first indication information, wherein the first indication information is used for indicating, to a terminal device, resource configuration information for processing a cross-link interference measurement signal. The first indication information may include time-frequency domain resource allocation information.

8 Claims, 7 Drawing Sheets network device 11 first terminal device 12 second terminal device 13

(56) References Cited

U.S. PATENT DOCUMENTS

| | | | | |
|---|---|---|---|---|
| 2023/0179382 A1* | 6/2023 | Ibrahim | ............... | H04J 11/0079 |
| | | | | 370/252 |
| 2023/0188229 A1* | 6/2023 | Xu | .................... | H04W 56/0015 |
| | | | | 370/329 |
| 2023/0327787 A1* | 10/2023 | Bai | ...................... | H04W 24/08 |
| | | | | 370/252 |
| 2024/0015537 A1* | 1/2024 | Zhang | ..................... | H04L 5/005 |
| 2024/0275508 A1* | 8/2024 | Chi | ...................... | H04B 17/345 |
| 2024/0413953 A1* | 12/2024 | Abotabl | ................ | H04L 5/0055 |
| 2024/0430023 A1* | 12/2024 | Yum | ................. | H04W 56/0045 |
| 2025/0226899 A1* | 7/2025 | Xiong | ................... | H04L 5/0073 |
| 2025/0261224 A1* | 8/2025 | Krishnan | ............. | H04W 24/10 |
| 2025/0317226 A1* | 10/2025 | Kim | ...................... | H04L 5/0048 |
| 2025/0357997 A1* | 11/2025 | Saha | ................. | H04B 7/18563 |

FOREIGN PATENT DOCUMENTS

| | | | | | |
|---|---|---|---|---|---|
| CN | 109219970 A | 1/2019 | | | |
| CN | 110049510 A | 7/2019 | | | |
| CN | 110383722 A | 10/2019 | | | |
| CN | 111417133 A | 7/2020 | | | |
| CN | 111565401 A | 8/2020 | | | |
| EP | 3567759 A1 | 11/2019 | | | |
| WO | WO 2020143736 A1 | 7/2020 | | | |
| WO | WO 2020165210 A1 | 8/2020 | | | |
| WO | WO-2023102317 A2 * | 6/2023 | ........... | H04B 17/103 |
| WO | WO-2023209543 A1 * | 11/2023 | ........... | H04L 5/0091 |
| WO | WO-2023212080 A1 * | 11/2023 | ............ | H04W 24/10 |
| WO | WO-2024181608 A1 * | 9/2024 | ......... | H04J 11/0023 |
| WO | WO-2025036240 A1 * | 2/2025 | ........... | H04L 5/0073 |
| WO | WO-2025165819 A1 * | 8/2025 | ........... | H04W 24/10 |

OTHER PUBLICATIONS

European Patent Application No. 21945500.3 Search Report dated Mar. 31, 2025, 11 pages.

* cited by examiner

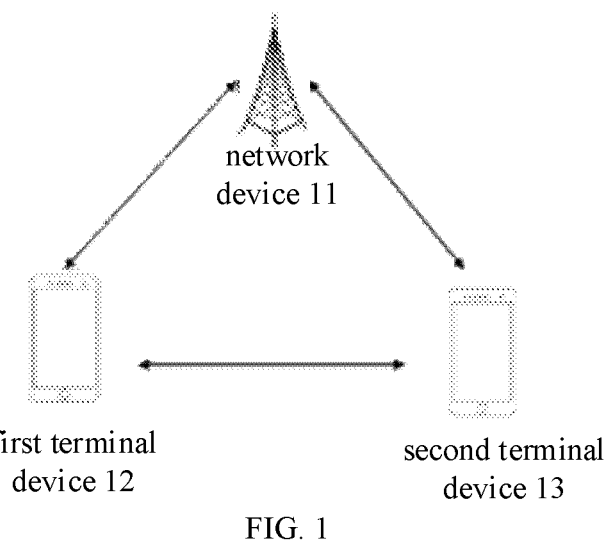

network
device 11 first terminal
device 12 second terminal
device 13

FIG. 1 sending first indication information, in which the first indication
information is configured to indicate resource allocation information
for processing a cross link interference measurement signal to a
terminal device                                                     ⟋21

FIG. 2 sending first indication information based on an RRC signaling, in
which the first indication information is configured to indicate
resource allocation information for processing a cross link
interference measurement signal to a terminal device               ⟋31 sending second indication information, in which the second
indication information is configured to indicate the terminal device
to activate one or more pieces of the resource allocation information
for processing the cross link interference measurement signal, or the
second indication information is configured to indicate the terminal
device to deactivate one or more pieces of the resource allocation
information for processing the cross link interference measurement
signal                                                              ⟋32

FIG. 3 sending the first indication information based on the RRC signaling, in which the first indication information is configured to indicate resource allocation information for processing the cross link interference measurement signal to the terminal device —41 sending third indication information, in which the third indication information is configured to indicate the terminal device to trigger one or more pieces of the resource allocation information for processing the cross link interference measurement signal —42

FIG. 4 sending the first indication information based on the RRC signaling, in which the first indication information is configured to indicate resource allocation information for processing the cross link interference measurement signal to the terminal device —51 sending second indication information based on a media access control (MAC) control element (CE), in which the second indication information is configured to indicate the terminal device to activate one or more pieces of the resource allocation information for processing the cross link interference measurement signal, or the second indication information is configured to indicate the terminal device to deactivate one or more pieces of the resource allocation information for processing the cross link interference measurement signal —52 sending third indication information based on DCI, in which the third indication information is configured to indicate the terminal device to trigger one or more pieces of the resource allocation information for processing the cross link interference measurement signal —53

FIG. 5 receiving first indication information, in which the first indication information is configured to indicate resource allocation information for sending a cross link interference measurement signal to the first terminal device —61

FIG. 6 receiving the first indication information based on an RRC signaling, in which the first indication information is configured to indicate resource allocation information for sending the cross link interference measurement signal to the first terminal device — 71 receiving second indication information, in which the second indication information is configured to indicate the first terminal device to activate one or more pieces of the resource allocation information for sending the cross link interference measurement signal, or the second indication information is configured to indicate the first terminal device to deactivate one or more pieces of the resource allocation information for sending the cross link interference measurement signal — 72

FIG. 7 receiving the first indication information based on the RRC signaling, in which the first indication information is configured to indicate resource allocation information for sending the cross link interference measurement signal to the first terminal device — 81 receiving third indication information, in which the third indication information is configured to indicate the first terminal device to trigger one or more pieces of the resource allocation information for sending the cross link interference measurement signal — 82

FIG. 8 receiving the first indication information based on the RRC signaling, in which the first indication information is configured to indicate resource allocation information for sending the cross link interference measurement signal to the first terminal device —91 receiving second indication information based on an MAC CE, in which the second indication information is configured to indicate the first terminal device to activate one or more pieces of the resource allocation information for sending the cross link interference measurement signal, or the second indication information is configured to indicate the terminal device to deactivate one or more pieces of the resource allocation information for sending the cross link interference measurement signal —92 receiving third indication information based on DCI, in which the third indication information is configured to indicate the first terminal device to trigger one or more pieces of the resource allocation information for sending the cross link interference measurement signal —93

FIG. 9 receiving first indication information, in which the first indication information is configured to indicate resource allocation information for processing a cross link interference measurement signal to a second terminal device —101

FIG. 10 receiving the first indication information based on an RRC signaling, in which the first indication information is configured to indicate resource allocation information for processing the cross link interference measurement signal to the second terminal device —111 receiving second indication information, in which the second indication information is configured to indicate the second terminal device to activate one or more pieces of the resource allocation information for processing the cross link interference measurement signal, or the second indication information is configured to indicate the second terminal device to deactivate one or more pieces of the resource allocation information for processing the cross link interference measurement signal —112

FIG. 11 receiving the first indication information based on the RRC signaling, in which the first indication information is configured to indicate resource allocation information for processing the cross link interference measurement signal to the second terminal device —121 receiving third indication information, in which the third indication information is configured to indicate the second terminal device to trigger one or more pieces of the resource allocation information for processing cross link interference measurement signal —122

FIG. 12 receiving the first indication information based on the RRC signaling, in which the first indication information is configured to indicate resource allocation information for processing the cross link interference measurement signal to the second terminal device — 131 receiving second indication information based on an MAC CE signaling, in which the second indication information is configured to indicate the second terminal device to activate one or more pieces of the resource allocation information for processing the cross link interference measurement signal, or the second indication information is configured to indicate the second terminal device to deactivate one or more pieces of the resource allocation information for processing the cross link interference measurement signal — 132 receiving third indication information based on the DCI, in which the third indication information is configured to indicate the second terminal device to trigger one or more pieces of the resource allocation information for processing the cross link interference measurement signal — 133

FIG. 13 communication apparatus transceiving module — 1401

FIG. 14

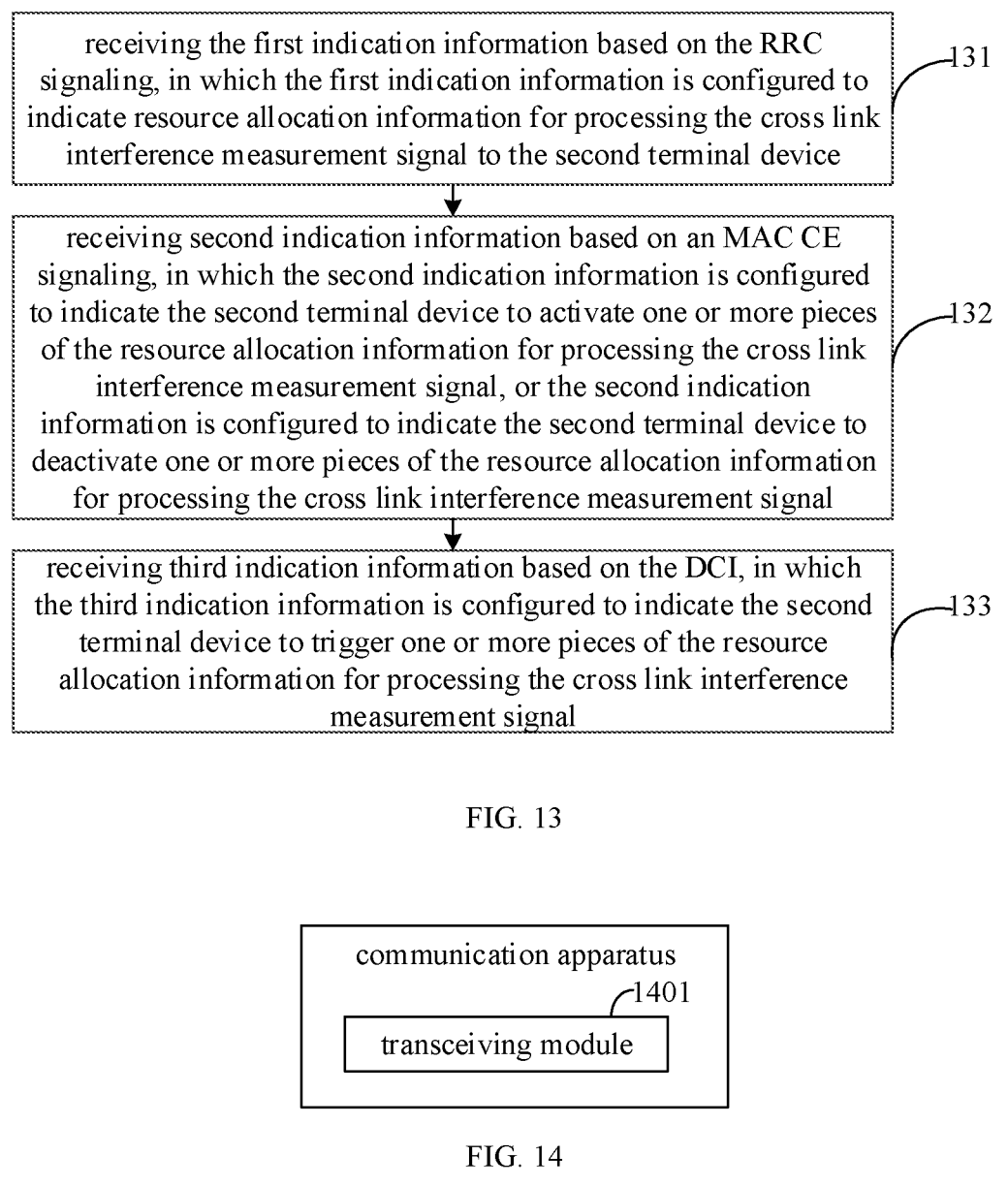

COMMUNICATION METHOD AND APPARATUS

CROSS-REFERENCE TO RELATED APPLICATION

This application is the U.S. National Stage Application of International Application No. PCT/CN2021/100744, filed on Jun. 17, 2021, the entire disclosure of which is incorporated herein by reference.

TECHNICAL FIELD

The disclosure relates to a field of wireless communication technologies, and particularly to a communication method, and a communication device.

BACKGROUND

In general, a full duplex communication technology means that mutual transmission of services between devices may occur at the same time and at the same frequency bandwidth. However, if the full duplex communication technology is directly applied to a wireless communication system, it may cause a serious interference for each of the devices. Therefore, it becomes an urgent problem to be solved how to reduce the interference in a full duplex communication process between the devices.

SUMMARY

In a first aspect, the embodiments of the disclosure provide a communication method, which is performed by a network device. The method includes: sending first indication information, in which the first indication information is configured to indicate resource allocation information for processing a cross link interference measurement signal to a terminal device.

In a second aspect, the embodiments of the disclosure provide another communication method, which is performed by a first terminal device. The method includes: receiving first indication information, in which the first indication information is configured to indicate resource allocation information for sending a cross link interference measurement signal to the first terminal device.

In a third aspect, the embodiments of the disclosure provide another communication method, which is performed by a second terminal device. The method includes: receiving first indication information, in which the first indication information is configured to indicate resource allocation information for processing a cross link interference measurement signal to the second terminal device.

BRIEF DESCRIPTION OF THE DRAWINGS

In order to explain technical solutions in the embodiments of the disclosure more clearly, the drawings described in the embodiments of the disclosure will be briefly introduced below.

FIG. 1 is a architecture diagram illustrating a communication system according to an embodiment of the disclosure.

FIG. 2 is a flowchart illustrating a communication method performed by a network device according to an embodiment of the disclosure.

FIG. 3 is a flowchart illustrating a communication method according to another embodiment of the disclosure.

FIG. 4 is a flowchart illustrating a communication method according to another embodiment of the disclosure.

FIG. 5 is a flowchart illustrating a communication method according to another embodiment of the disclosure.

FIG. 6 is a flowchart illustrating a communication method performed by a first terminal device according to another embodiment of the disclosure.

FIG. 7 is a flowchart illustrating a communication method according to an embodiment of the disclosure.

FIG. 8 is a flowchart illustrating a communication method according to another embodiment of the disclosure.

FIG. 9 is a flowchart illustrating a communication method according to another embodiment of the disclosure.

FIG. 10 is a flowchart illustrating a communication method performed by a second terminal device according to another embodiment of the disclosure.

FIG. 11 is a flowchart illustrating a communication method according to another embodiment of the disclosure.

FIG. 12 is a flowchart illustrating a communication method according to another embodiment of the disclosure.

FIG. 13 is a flowchart illustrating a communication method according to another embodiment of the disclosure.

FIG. 14 is a structural diagram illustrating a communication apparatus according to an embodiment of the disclosure.

DETAILED DESCRIPTION

Figure 15:
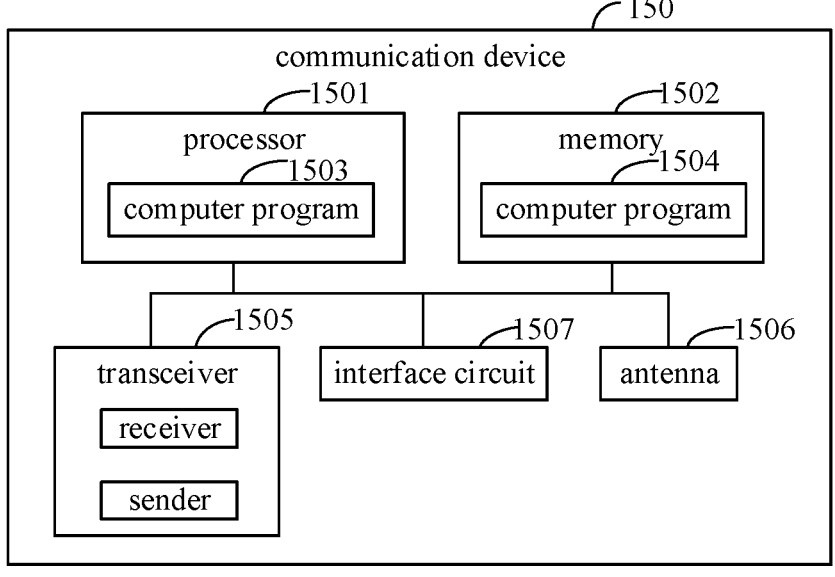
FIG. 15 is a structural diagram illustrating a communication device according to another embodiment of the disclosure.

For convenience of understanding, terms involved in the disclosure are introduced first.

1. Full Duplex Communication

The full duplex communication may be divided into frequency division multiplexing (FDM) and time division multiplexing (TDM).

The FDM means that an entire transmission frequency band may be divided into several frequency channels, each UE may occupy one frequency channel to send data, and there is a guard band between the frequency channels.

In addition, the TDM means that time may be divided into small time slices, each time slice is divided into several channels (slots), and each UE may occupy one channel to send data.

2. Radio Resource Control (RRC)

The RRC, referred to as radio resource management (RRM) or radio resource allocation (RRA), performs wireless resource management, control and scheduling by certain strategies and means, and makes full use of limited wireless network resources as much as possible on the premise of satisfying requirements of quality of service, to ensure to reach a planned coverage area, and improve a service capacity and a resource utilization rate as much as possible.

3. Downlink Control Information (DCI)

The DCI may include uplink and downlink resource allocation, hybrid automatic repeat request information, power control, etc.

According to the communication method and the communication device in the disclosure, the network device indicates resource allocation information for processing the cross link interference measurement signal to the terminal device, so that the terminal device may perform the full duplex communication based on the obtained resource allocation information, thus reducing the interference during the full duplex communication process of the terminal device as much as possible, and improving the quality and efficiency of communication transmission.

In order to understand the communication method in the embodiments of the disclosure better, a communication system to which the embodiments of the disclosure are applicable is described below.

As illustrated in FIG. 1, FIG. 1 is a architecture diagram illustrating a communication system according to an embodiment of the disclosure. The communication system may include, but is not limited to, one network device, one first terminal device and one second terminal device. The number of devices and the device form shown in FIG. 1 are only for example and do not constitute a limitation of the embodiments of the disclosure. Two or more network devices, two or more first terminal devices and two or more second terminal devices may be included in practical applications. The communication system as illustrated in FIG. 1 includes one network device 11, one first terminal device 12 and one second terminal device 13 for example.

It needs to be noted that the technical solution in the embodiments of the disclosure is applicable to various communication systems. For example, a long term evolution (LTE) system, a 5th generation (5G) mobile communication system, a 5G new radio (NR) system or other future new mobile communication systems. It should be noted that a sidelink in the embodiments of the disclosure may be referred to as a side link or a direct link.

The network device 11 in the embodiments of the disclosure is an entity for sending or receiving a signal at a network side. For example, the network device 11 may be an evolved NodeB (eNB), a transmission reception point (TRP), a next generation NodeB (gNB) in an NR system, a base station in other future mobile communication systems, or an access point in a wireless fidelity (WiFi) system. A specific technology and a specific device form adopted by the network device are not limited in the embodiments of the disclosure.

The network device 11 according to the embodiments of the disclosure may consist of a central unit (CU) and a distributed unit (DU). The CU may also be referred to as a control unit, and protocol layers of the network device such as a base station, may be split by using a structure of the CU-DU, functions of a part of the protocol layers are placed in the CU for centralized control, and functions of a remaining part or all of the protocol layers are distributed in the DU, and the DU is centrally controlled by the CU.

The first terminal device 12 and the second terminal device 13 in the embodiments of the disclosure are entities for receiving or sending a signal at a user side, for example, a mobile phone. The terminal device may be referred to as a terminal, a user equipment (UE), a mobile station (MS), a mobile terminal (MT), etc. The terminal device may be an automobile with a communication function, a smart automobile, a mobile phone, a wearable device, a tablet computer (Pad), a computer with a wireless transceiving function, a virtual reality (VR) terminal device, an augmented reality (AR) terminal device, a wireless terminal device in industrial control, a wireless terminal device in self-driving, a wireless terminal device in a remote medical surgery, a wireless terminal device in a smart grid, a wireless terminal device in transportation safety, a wireless terminal device in a smart home, etc. Specific technologies and specific device forms adopted by the first terminal device 12 and the second terminal device 13 are not limited in the embodiments of the disclosure.

It may be understood that, the communication system described in the embodiments of the disclosure are intended to explain the technical solutions of the embodiments of the disclosure more clearly, and does not constitute a limitation to the technical solutions according to the embodiments of the disclosure. Those skilled in the art know that, with evolution of a system architecture and emergence of a new business scenario, the technical solutions according to the embodiments of the disclosure are applied for similar technical problems.

A communication method, and a communication device according to the disclosure are described in combination with attached drawings.

As illustrated in FIG. 2, FIG. 2 is a flowchart illustrating a communication method according to an embodiment of the disclosure. The method is performed by a network device. As illustrated in FIG. 2, the method may include but not limited to the following step.

At step 21, first indication information is sent. The first indication information is configured to indicate resource allocation information for processing a cross link interference measurement signal to a terminal device.

It may be understood that, the terminal device may be a first terminal device or a second terminal device.

The first terminal device may determine resource allocation information for sending the cross link interference measurement signal based on the first indication information from the network device, thus performing the full duplex communication with the network device based on the determined resource allocation information.

Correspondingly, the second terminal device may determine resource allocation information for receiving the cross link interference measurement signal based on the first indication information from the network device, thus performing the full duplex communication with the network device based on the determined resource allocation information.

In general, the network device may perform the full duplex communication based on full duplex communication information supported by the network device itself. However, when the terminal device performs the full duplex communication, there may be a self-interference and a mutual interference between adjacent terminal devices, which may cause an interference on the communication transmission and affect the quality and the efficiency of communication transmission.

In the embodiments of the disclosure, the network device may indicate resource allocation information for processing the cross link interference measurement signal to the terminal device, so that the terminal device may perform the full duplex communication based on the obtained resource allocation information, thus reducing the interference during the full duplex communication process of the terminal device as much as possible, and improving the quality and the efficiency of communication transmission.

The first indication information may indicate time-frequency domain resource allocation information for sending the cross link interference measurement signal.

The time-frequency domain resource allocation information may be time domain resource allocation information for sending the cross link interference measurement signal, or may be frequency domain resource allocation information for sending the cross link interference measurement signal, or may be time domain and frequency domain resource allocation information for sending the cross link interference measurement signal, which is not limited in the disclosure.

For example, the first indication information indicates to the first network device that time domain resources for sending the cross link interference measurement signal are t1 to t2. After the first terminal device receives the first indication information, the cross link interference measurement signal may be sent within the t1 to t2 time domain resources.

Optionally, the first indication information may indicate a sending beam group for sending the cross link interference measurement signal.

There may be one or more sending beams in the sending beam group, which are not limited in the disclosure.

For example, the first indication information indicates that the first network device may send the cross link interference measurement signal by using a beam 1 and a beam 2. After the first terminal device receives the first indication information, the cross link interference measurement signal may be sent by using the beam 1 and the beam 2.

The first indication information may indicate time-frequency domain resource allocation information for measuring the cross link interference measurement signal.

For example, the first indication information indicates to the second terminal device that frequency domain resources for measuring the cross link interference measurement signal are F1 and F2. After the second terminal device receives the first indication information, the cross link interference measurement signal may be measured on the F1 and F2 frequency domain resources.

Optionally, the first indication information may indicate time-frequency domain resource allocation information for receiving the cross link interference measurement signal.

For example, the first indication information indicates to the second terminal device that a frequency domain resource for receiving the cross link interference measurement signal is F1. After the second terminal device receives the first indication information, the cross link interference measurement signal may be received on the F1 frequency domain resource.

Optionally, the first indication information may indicate a receiving beam group for receiving the cross link interference measurement signal.

There may be one or more receiving beams in the receiving beam group, which are not limited in the disclosure.

For example, the first indication information indicates that the second network device may receive the cross link interference measurement signal by using the beam 1. After the second terminal device receives the first indication information, the cross link interference measurement signal may be received by using a beam.

Optionally, the first indication information may indicate a reporting threshold for a number of cross link interference measurements.

For example, the first indication information indicates to the second terminal device that the reporting threshold for the number of cross link interference measurements is X. After the second terminal device receives the first indication information, reporting may be performed when the number of cross link interference measurements exceeds X.

It should be noted that the above examples are illustrative only and are not intended to be a limitation of contents included in the first indication information in the embodiments of the disclosure.

It may be understood that the first indication information may include the above one content item, or may include the above plurality of content items, which is not limited in the disclosure.

Optionally, the cross link interference measurement signal includes at least one of: a physical uplink shared channel (PUSCH) signal; a physical uplink control channel (PUCCH) signal; a sounding reference signal (SRS); or a specified cross link interference measurement signal.

There may be a plurality of cross link interference measurement signals, and the specified cross link interference measurement signal may be one or more of the cross link interference measurement signals, which are not limited in the disclosure.

For example, the first indication information indicates that the frequency domain resource for sending the PUSCH signal is F1 and the frequency domain resource for sending the PUCCH signal is F2. After the first terminal device receives the first indication information, the PUSCH signal may be sent on the F1 frequency domain resource, and the PUCCH signal may be sent on the F2 frequency domain resource.

It should be noted that the above examples are illustrative only and are not intended to be a limitation of contents included in the first indication information in the embodiments of the disclosure.

The sending beam group of the cross link interference measurement signal may be indicated by any one of: a specified set of synchronization signal blocks (SSBs), or a specified set of channel state information (CSI) reference signals (RSs).

The SSBs may consist of primary synchronization signals (PSSs), secondary synchronization signals (SSSs) and a physical broadcast channel (PBCH).

In addition, there may be a plurality of SSBs in the set of SSBs, and there may be one or more SSBs in the specified set of SSBs, which are not limited in the disclosure, It may be understood that, there may be a plurality of CSI RSs in the set of CSI RSs, and there may be one or more CSI RSs in the specified set of CSI RSs, which are not limited in the disclosure, For example, PSSs are included in the specified set of SSBs, and a sending beam group indicated by the PSSs is a beam 1 and a beam 3. After the first terminal device receives the PSSs, the cross link interference measurement signal may be sent by using the beam 1 and the beam 3.

It should be noted that the above examples are illustrative only and are not intended to be a limitation of the sending beam group and the SSBs in the embodiments of the disclosure.

By implementing the embodiments of the disclosure, the network device may indicate resource allocation information for processing the cross link interference measurement signal to the terminal device, so that the terminal device may perform the full duplex communication based on the obtained resource allocation information, thus reducing the interference during the full duplex communication process of the terminal device as much as possible, and improving the quality and the efficiency of communication transmission.

As illustrated in FIG. 3, FIG. 3 is a flowchart illustrating a communication method according to an embodiment of the disclosure. The method is performed by a network device. As illustrated in FIG. 3, the method may include but not limited to the following steps.

At step 31, the first indication information is sent based on an RRC signaling. The first indication information is configured to indicate the resource allocation information for processing the cross link interference measurement signal to the terminal device.

For example, it is agreed in a protocol that or the network device configures that, a specific bit may be added in the RRC signaling, and a value of the added bit represents the first indication information. As such, after the terminal device receives the RRC signaling from the network device, the first indication information may be obtained based on the value of the specific bit according to the agreed protocol, which is not limited in the disclosure.

It needs to be noted that, the specific contents and implementations of the first indication information may refer to descriptions of other embodiments, which are not limited in the disclosure.

At step 32, second indication information is sent. The second indication information is configured to indicate the terminal device to activate one or more pieces of the resource allocation information for processing the cross link interference measurement signal, or the second indication information is configured to indicate the terminal device to deactivate one or more pieces of the resource allocation information for processing the cross link interference measurement signal.

For example, it is agreed in the protocol that or the network device configures that, a specific bit may be added in the second indication information, and a value of the added bit represents the second indication information.

For example, it is agreed in the protocol that, when the value of the added bit is 1, it indicates activating all pieces of resource allocation information for processing the cross link interference measurement signal indicated by the first indication information; when the value of the added bit is 0, it indicates deactivating all the pieces of resource allocation information for processing the cross link interference measurement signal indicated by the first indication information. Therefore, after the terminal device receives the second indication information from the network device, according to the agreed protocol, activating or deactivating all the pieces of resource allocation information for processing the cross link interference measurement signal indicated by the first indication information may be obtained based on the value of the specific bit.

For another example, it is agreed in the protocol that or the network device configures that, there are 4 added bits, and each bit corresponds to one piece of resource allocation information for processing the cross link interference measurement signal. If a value of a certain bit is 1, it indicates activating a piece of the resource allocation information for processing the cross link interference measurement signal corresponding to the bit; if the values of a plurality of bits are 1, it indicates activating pieces of the resource allocation information for processing the cross link interference measurement signal corresponding to the plurality of bits. Alternatively, if a value of a certain bit is 0, it indicates deactivating a piece of the resource allocation information for processing the cross link interference measurement signal corresponding to the bit; if the values of a plurality of bits are 0, it indicates deactivating pieces of the resource allocation information for processing the cross link interference measurement signal corresponding to the plurality of bits. As such, after the terminal device receives the second indication information from the network device, activating or deactivating one or more pieces of resource allocation information for processing the cross link interference measurement signal may be obtained based on the value of the specific bit according to the agreed protocol.

It should be noted that the above examples are illustrative only and are not intended to be a limitation of the second indication information, and a number of bits and a value of bits in the second indication information in the embodiments of the disclosure.

It needs to be noted that, the specific contents and implementations of the resource allocation information for processing the cross link interference measurement signal may refer to descriptions of other embodiments of the disclosure, which are not repeated here.

By implementing the embodiments of the disclosure, the network device may send the first indication information based on the RRC signaling to indicate resource allocation information for processing the cross link interference measurement signal to the terminal device, and may further send the second indication information to indicate activating or deactivating the resource allocation information for processing the cross link interference measurement signal to the terminal device, so that the terminal device may perform the full duplex communication based on the obtained resource allocation information, thus reducing the interference during the full duplex communication process of the terminal device as much as possible, and improving the quality and the efficiency of communication transmission.

Figures 4, 5, 6:
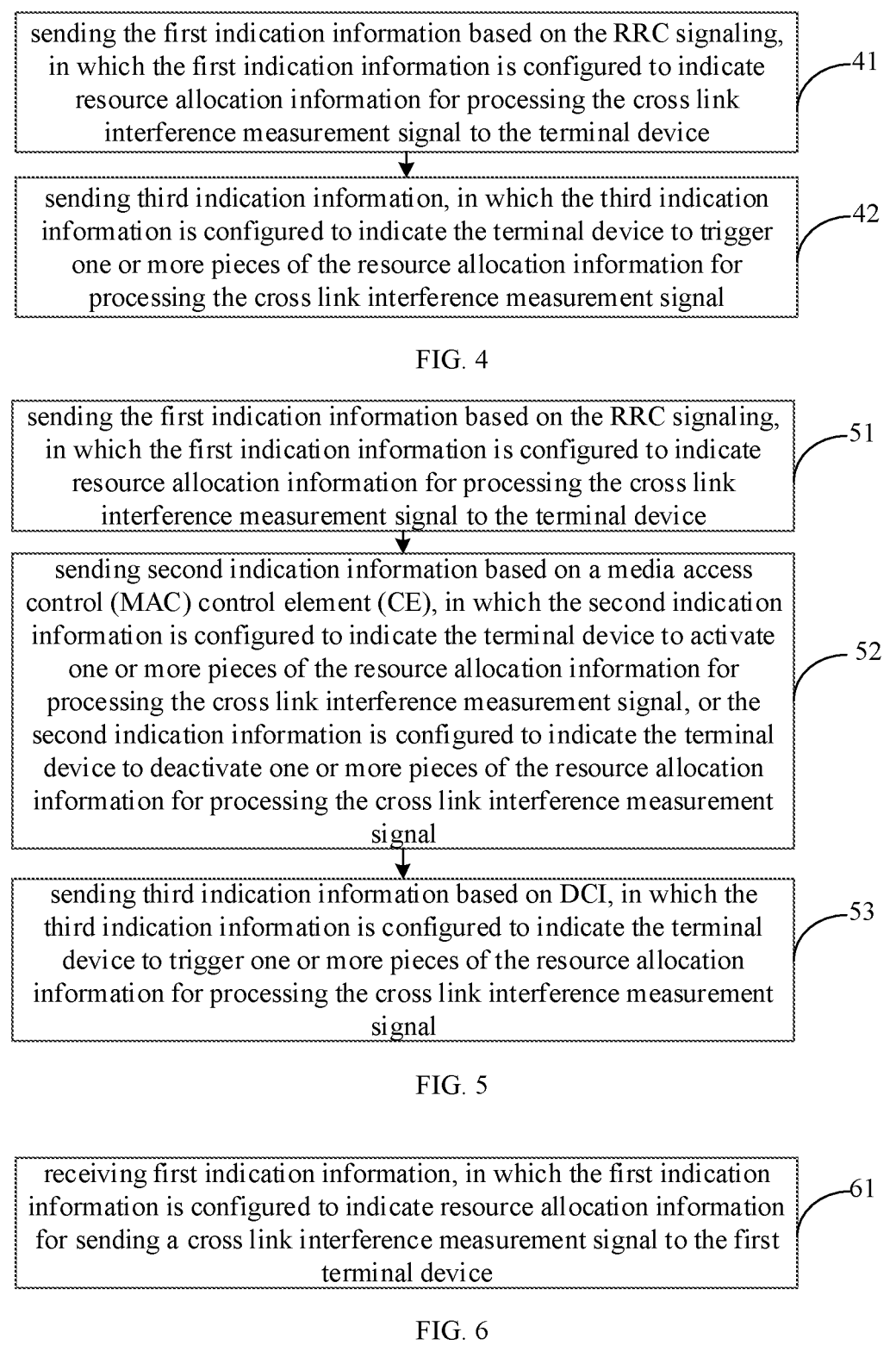

As illustrated in FIG. 4, FIG. 4 is a flowchart illustrating a communication method according to an embodiment of the disclosure. The method is performed by a network device. As illustrated in FIG. 4, the method may include but not limited to the following steps.

At step 41, the first indication information is sent based on the RRC signaling. The first indication information is configured to indicate the resource allocation information for processing the cross link interference measurement signal to the terminal device.

It needs to be noted that, the specific contents and implementations of the first indication information may refer to descriptions of other embodiments, which are not limited in the disclosure.

It needs to be noted that, the specific contents and implementations of step 41 may refer to descriptions of other embodiments, which are not repeated here.

At step 42, third indication information is sent based on downlink control information (DCI). The third indication information is configured to indicate the terminal device to trigger one or more pieces of the resource allocation information for processing the cross link interference measurement signal.

For example, it may be agreed in the protocol that or the network device may configure that, a value of first 2 bits in the third indication information are configured to indicate triggering a sending beam group for sending the cross link interference measurement signal and a reporting threshold for a number of cross link interference measurements. For example, when the value of the first 2 bits is "01", it indicates triggering the sending beam group for sending the cross link interference measurement signal; when the value of the first 2 bits is "10", it indicates triggering the reporting threshold for the number of cross link interference measurements; and the value of the first 2 bits is "11", it indicates triggering both the sending beam group for sending the cross link interference measurement signal and the reporting threshold for the number of cross link interference measurements, etc. As such, after the terminal device receives the third indication information from the network device, triggering the one or more pieces of resource allocation information for processing the cross link interference measurement signal may be obtained based on the value of the specific bit according to the agreed protocol.

Alternatively, the value of the plurality of bits indicates triggering the one or more pieces of resource allocation information for processing the cross link interference measurement signal, which is not limited in the disclosure.

Alternatively, it may be agreed in advance that, when the third indication information includes "AAA", it indicates triggering one piece of resource allocation information for processing the cross link interference measurement signal, and when the third indication information includes "BBB", it indicates triggering a plurality of pieces of resource allocation information for processing the cross link interference measurement signal.

It should be noted that the above examples are illustrative only and are not intended to be a limitation of the specific contents of resource allocation information for processing the cross link interference measurement signal, the value of the bit in the third indication information and a corresponding relationship between the specific contents of resource allocation information and the value of the bit, in the embodiments of the disclosure.

It needs to be noted that, the specific contents and implementations of the resource allocation information for processing the cross link interference measurement signal may refer to descriptions of other embodiments of the disclosure, which are not repeated here.

By implementing the embodiments of the disclosure, the network device may send the first indication information based on the RRC signaling to indicate resource allocation information for processing the cross link interference measurement signal to the terminal device, and may further send the third indication information based on the DCI to indicate triggering the resource allocation information for processing the cross link interference measurement signal to the terminal device, so that the terminal device may perform the full duplex communication based on the obtained resource allocation information, thus reducing the interference during the full duplex communication process of the terminal device as much as possible, and improving the quality and the efficiency of communication transmission.

As illustrated in FIG. 5, FIG. 5 is a flowchart illustrating a communication method according to an embodiments of the disclosure. The method is performed by a network device. As illustrated in FIG. 5, the method may include but not limited to the following steps.

At step 51, the first indication information is sent based on the RRC signaling. The first indication information is configured to indicate the resource allocation information for processing the cross link interference measurement signal to the terminal device.

It needs to be noted that, the specific contents and implementations of the first indication information may refer to descriptions of other embodiments, which are not limited in the disclosure.

It needs to be noted that, the specific contents and implementations of step 51 may refer to descriptions of other embodiments, which are not repeated here.

At step 52, second indication information is sent based on a media access control (MAC) control element (CE). The second indication information is configured to indicate the terminal device to activate one or more pieces of the resource allocation information for processing the cross link interference measurement signal, or the second indication information is configured to indicate the terminal device to deactivate one or more pieces of the resource allocation information for processing the cross link interference measurement signal.

The MAC is responsible for controlling and connecting a physical medium of a physical layer.

It may be understood that, a corresponding relationship between the resource allocation information for processing the cross link interference measurement signal and the bit of the MAC CE signaling may be agreed in the protocol or configured by the network device. For example, it is agreed in the protocol that, the time-frequency domain resource allocation information for sending the cross link interference measurement signal corresponds to a first bit of the MAC CE signaling, and the time-frequency domain resource allocation information for receiving the cross link interference measurement signal corresponds to a second bit of the MAC CE signaling, etc. It is not limited in the disclosure.

Optionally, it may be agreed in the protocol that or the network device configures that, if a certain piece of resource allocation information for processing the cross link interference measurement signal is activated, the value of the corresponding bit may be taken as 1, and if a certain piece of resource allocation information for processing the cross link interference measurement signal is deactivated, the value of the corresponding bit may be taken as 0.

Alternatively, it may be agreed in the protocol that the value of the plurality of bits of the MAC CE signaling may indicate resource allocation information for processing the cross link interference measurement signal. For example, the MAC CE signaling includes 2 bits, and the resource allocation information for processing the cross link interference measurement signal includes respectively a sending beam group for sending the cross link interference measurement signal and a receiving beam group for receiving the cross link interference measurement signal. If the value of the 2 bits is 00, it indicates deactivating both the sending beam group for sending the cross link interference measurement signal and the receiving beam group for receiving the cross link interference measurement signal; when the value of the 2 bits is 01, it indicates activating the sending beam group for sending the cross link interference measurement signal and deactivating the receiving beam group for receiving the cross link interference measurement signal; when the value of the two bits is 10, it indicates activating the receiving beam group for receiving the cross link interference measurement signal and deactivating the sending beam group for sending the cross link interference measurement signal; when the value of the two bits is 11, it indicates activating both the sending beam group for sending the cross link interference measurement signal and the receiving beam group for receiving the cross link interference measurement signal, etc.

It should be noted that the above examples are illustrative only and are not intended to be a limitation of a number of bits included in the MAC CE signaling, a value of each bit and a corresponding relationship between the bits in the MAC CE signaling and the resource allocation information for processing the cross link interference measurement signal in the embodiments of the disclosure.

It needs to be noted that, the specific contents and implementations of the second indication information may refer to descriptions of other embodiments, which are not repeated here.

At step 53, third indication information is sent based on the DCI. The third indication information is configured to indicate the terminal device to trigger one or more pieces of the resource allocation information for processing the cross link interference measurement signal.

For example, a specific bit may be added in the DCI, and the added bit represents the third indication information.

Optionally, it may be agreed in the protocol that, when the value of the added bit in the DCI is 1, it indicates triggering the resource allocation information of the cross link interference measurement signal corresponding to the bit.

For example, there are 4 added bits in the DCI, and each bit corresponds to one piece of resource allocation information for processing the cross link interference measurement signal. For example, a first bit corresponds to the time-frequency domain resource allocation information for sending the cross link interference measurement signal, a second bit corresponds to the sending beam group for sending the cross link interference measurement signal, a third bit corresponds to the time-frequency domain resource allocation information for receiving the cross link interference measurement signal, and a fourth bit corresponds to the receiving beam group for receiving the cross link interference measurement signal. If the value of the first bit and the value of the second bit are both 1, the terminal device may trigger the time-frequency domain resource allocation information for sending the cross link interference measurement and the sending beam group for sending the cross link interference measurement signal based on the values of the specific bits according to the agreed protocol, after receiving the DCI from the network device.

It should be noted that the above examples are illustrative only and are not intended to be a limitation of the specific contents of the resource allocation information for processing the cross link interference measurement signal, the value of the bit in the DCI and a corresponding relationship between the specific contents of the resource allocation information and the value of the bit, in the embodiments of the disclosure.

It needs to be noted that, the specific contents and implementations of the resource allocation information for processing the cross link interference measurement signal may refer to descriptions of other embodiments of the disclosure, which are not repeated here.

By implementing the embodiments of the disclosure, the network device may send the first indication information based on the RRC signaling to indicate resource allocation information for processing the cross link interference measurement signal to the terminal device, and may send the second indication information based on the MAC CE signaling to indicate the terminal device to activate or deactivate the resource allocation information for processing the cross link interference measurement signal, so that the terminal device may perform the full duplex communication based on the obtained resource allocation information, thus reducing the interference during the full duplex communication process of the terminal device as much as possible, and improving the quality and the efficiency of communication transmission.

As illustrated in FIG. 6, FIG. 6 is a flowchart illustrating a communication method according to an embodiment of the disclosure. The method is performed by a first terminal device. As illustrated in FIG. 6, the method may include but not limited to the following step.

At step 61, first indication information is received. The first indication information is configured to indicate resource allocation information for sending a cross link interference measurement signal to the first terminal device.

In general, the network device may perform the full duplex communication based on full duplex communication information supported by the network device itself. However, when the terminal device performs the full duplex communication, there may be a self-interference and a mutual interference between adjacent terminal devices, which may cause an interference on the communication transmission and affect the quality and the efficiency of communication transmission.

In the embodiments of the disclosure, the first terminal device may obtain resource allocation information for sending the cross link interference measurement signal based on the received first indication information from the network device. Thus, the first terminal device may perform the full duplex communication based on the obtained resource allocation information, thus reducing the interference during the full duplex communication process of the terminal device as much as possible, and improving the quality and the efficiency of communication transmission.

Optionally, the first indication information may include at least one of: time-frequency domain resource allocation information for sending the cross link interference measurement signal and a sending beam group for sending the cross link interference measurement signal.

It needs to be noted that, the specific contents and implementations of the first indication information may refer to descriptions of other embodiments, which are not limited in the disclosure.

Optionally, the cross link interference measurement signal includes at least one of: a PUSCH signal; a PUCCH signal; an SRS; or a specified cross link interference measurement signal.

It needs to be noted that, the specific contents and implementations of the cross link interference measurement signal may refer to descriptions of other embodiments of the disclosure, which are not repeated here.

Optionally, the sending beam group for sending the cross link interference measurement signal may be indicated by any one of: a specified set of SSBs, or a specified set of CSI RSs.

There may be a plurality of SSBs in the set of SSBs, and there may be one or more SSBs in the specified set of SSBs, which are not limited in the disclosure, It needs to be noted that, the specific contents and implementations of the specified set of SSBs and the specified set of CSI RSs may refer to descriptions of other embodiments, which are not repeated here.

Optionally, an uplink beam corresponding to an optimal receiving beam in a specified set of SSBs may be determined as a sending beam of the cross link interference measurement signal.

Interference may be minimized by receiving the beam via the optimal receiving beam. In the embodiments of the disclosure, in order to ensure the accuracy and reliability of sending the cross link interference measurement signal, the uplink beam corresponding to the optimal receiving beam in the specified set of SSBs may be determined as the sending beam of the cross link interference measurement signal, to minimize the interference of sending the cross link interference measurement signal as much as possible.

Optionally, the uplink beam corresponding to the optimal receiving beam in the specified set of CSI SSBs may be further determined as the sending beam of the cross link interference measurement signal, so as to reduce the interference as much as possible, to improve the accuracy and reliability of sending the cross link interference measurement signal.

By implementing the embodiments of the disclosure, the first terminal device may obtain the resource allocation information for sending the cross link interference measurement signal based on the indication of the first indication information, so that the first terminal device may perform the full duplex communication based on the obtained resource allocation information, thus reducing the interference during the full duplex communication process of the terminal device as much as possible, and improving the quality and the efficiency of communication transmission.

Figures 7, 8:
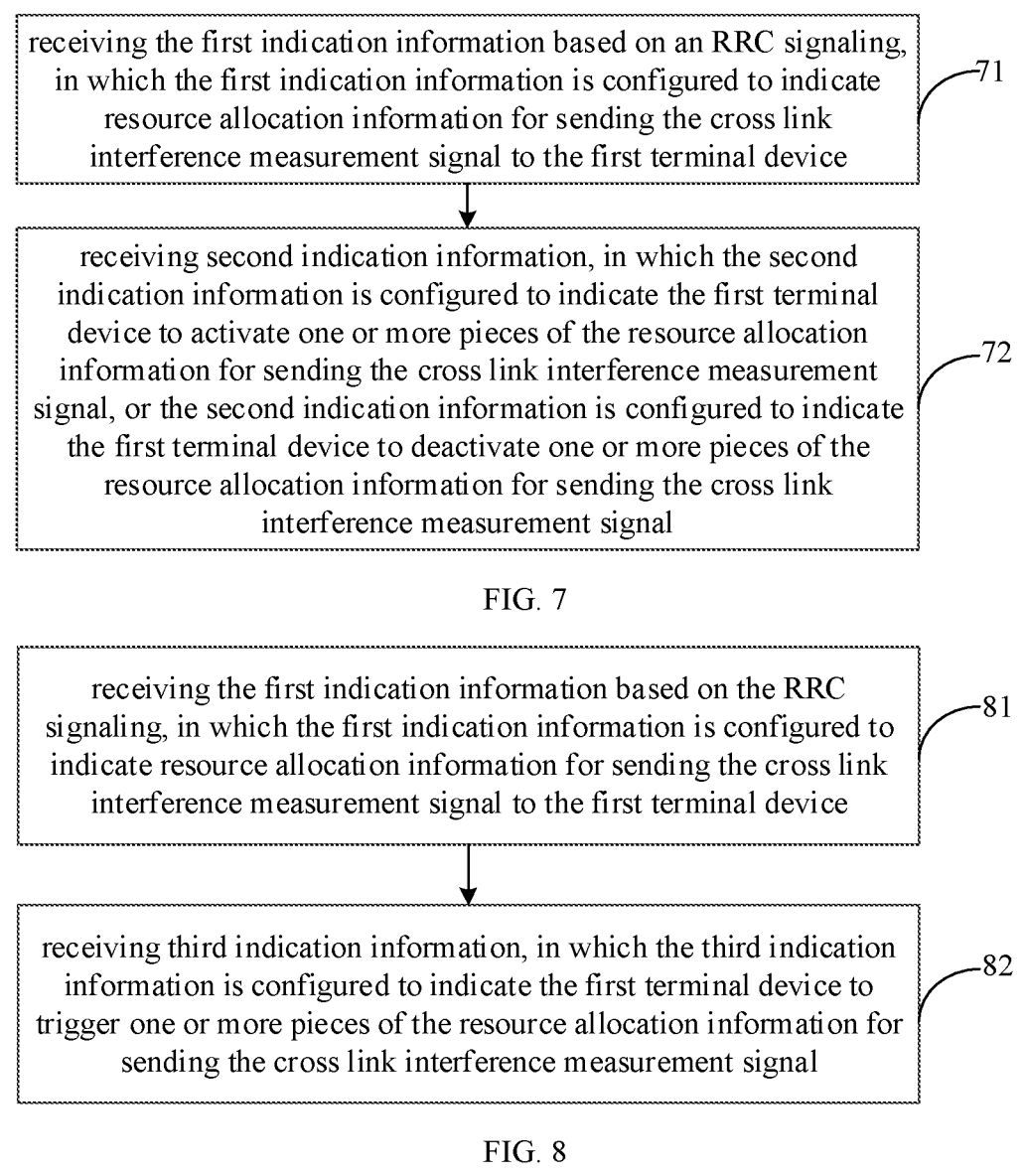

As illustrated in FIG. 7, FIG. 7 is a flowchart illustrating a communication method according to an embodiment of the disclosure. The method is performed by a first terminal device. As illustrated in FIG. 7, the method may include but not limited to the following steps.

At step 71, the first indication information is received based on the RRC signaling. The first indication information is configured to indicate the resource allocation information for sending the cross link interference measurement signal to the first terminal device.

For example, it is agreed in the protocol that or the network device configures that, a specific bit may be added in the RRC signaling, and a value of the added bit represents the first indication information. As such, after the first terminal device receives the RRC signaling from the network device, the first indication information may be obtained based on the value of the specific bit according to the agreed protocol, which is not limited in the disclosure.

It needs to be noted that, the specific contents and implementations of the first indication information may refer to descriptions of other embodiments, which are not limited in the disclosure.

At step 72, second indication information is received. The second indication information is configured to indicate the first terminal device to activate one or more pieces of the resource allocation information for sending the cross link interference measurement signal, or the second indication information is configured to indicate the first terminal device to deactivate one or more pieces of the resource allocation information for sending the cross link interference measurement signal.

For example, it is agreed in the protocol that or the network device configures that, a specific bit may be added in the second indication information, and a value of the added bit represents the second indication information. As such, after the terminal device receives the second indication information from the network device, activating or deactivating the resource allocation information for sending the cross link interference measurement signal indicated by the first indication information may be obtained based on the value of the specific bit according to the agreed protocol.

It should be noted that the above examples are illustrative only and are not intended to be a limitation of the second indication information, and a number of bits and a value of bits in the second indication information in the embodiments of the disclosure.

By implementing the embodiments of the disclosure, the first network device may receive the first indication information based on the RRC signaling to obtain the resource allocation information for sending the cross link interference measurement signal, and may determine activating or deactivating the resource allocation information for sending the cross link interference measurement signal based on the indication of the received second indication information, so that the first terminal device may perform the full duplex communication based on the obtained resource allocation information, thus reducing the interference during the full duplex communication process of the terminal device as much as possible, and improving the quality and the efficiency of communication transmission.

As illustrated in FIG. 8, FIG. 8 is a flowchart illustrating a communication method according to an embodiment of the disclosure. The method is performed by a first terminal device. The method is performed by a first terminal device. As illustrated in FIG. 8, the method may include but not limited to the following steps.

At step 81, the first indication information is received based on the RRC signaling. The first indication information is configured to indicate the resource allocation information for sending the cross link interference measurement signal to the first terminal device.

It needs to be noted that, the specific contents and implementations of the first indication information may refer to descriptions of other embodiments, which are not limited in the disclosure.

It needs to be noted that, the specific contents and implementations of step 81 may refer to descriptions of other embodiments, which are not repeated here.

At step 82, third indication information is received. The third indication information is configured to indicate the first terminal device to trigger one or more pieces of the resource allocation information for sending the cross link interference measurement signal.

For example, it is agreed in the protocol that or the network device configures that, a specific bit may be added in the third indication information, and a value of the added bit represents the third indication information. As such, after the terminal device receives the third indication information from the network device, triggering the resource allocation information for sending the cross link interference measurement signal indicated by the first indication information may be obtained based on the value of the specific bit according to the agreed protocol.

It should be noted that the above examples are illustrative only and are not intended to be a limitation of the third indication information, and a number of bits and a value of bits in the third indication information in the embodiments of the disclosure.

It needs to be noted that, the specific contents and implementations of the resource allocation information for processing the cross link interference measurement signal may refer to descriptions of other embodiments of the disclosure, which are not repeated here.

By implementing the embodiments of the disclosure, the first terminal device may receive the first indication information based on the RRC signaling to obtain the resource allocation information for sending the cross link interference measurement signal, and may obtain triggering the resource allocation information for sending the cross link interference measurement signal based on the indication of the received third indication information, so that the full duplex communication may be performed based on the obtained resource allocation information, thus reducing the interference during the full duplex communication process of the terminal device as much as possible, and improving the quality and the efficiency of communication transmission.

Figures 9, 10:
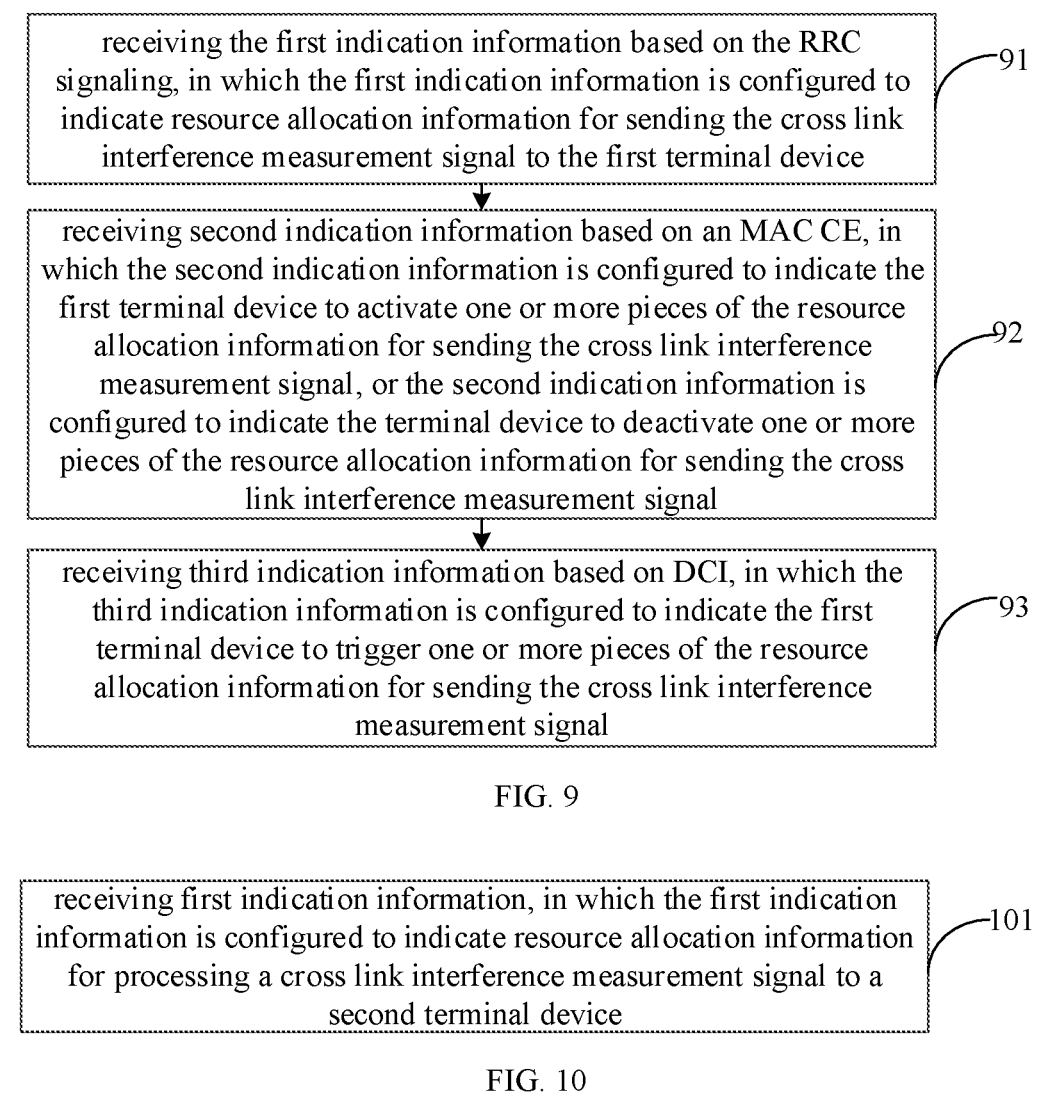

As illustrated in FIG. 9, FIG. 9 is a flowchart illustrating a communication method according to an embodiment of the disclosure. The method is performed by a first terminal device. As illustrated in FIG. 9, the method may include but not limited to the following steps.

At step 91, the first indication information is received based on the RRC signaling. The first indication information is configured to indicate the resource allocation information for sending the cross link interference measurement signal to the first terminal device.

It needs to be noted that, the specific contents and implementations of the first indication information may refer to descriptions of other embodiments, which are not limited in the disclosure.

It needs to be noted that, the specific contents and implementations of step 91 may refer to descriptions of other embodiments, which are not repeated here.

At step 92, second indication information is received based on the MAC CE signaling. The second indication information is configured to indicate the first terminal device to activate one or more pieces of the resource allocation information for sending the cross link interference measurement signal, or the second indication information is configured to indicate the terminal device to deactivate one or more pieces of the resource allocation information for sending the cross link interference measurement signal.

For example, a corresponding relationship between the resource allocation information for sending the cross link interference measurement signal and the specific bit in the MAC CE signaling may be agreed in the protocol or configured by the network device. For another example, if the value of the bit is set to 1, it indicates activating the resource allocation information for sending the cross link interference measurement signal corresponding to the bit; if the value of the bit is 0, it indicates deactivating the resource allocation information for deactivating the cross link interference measurement signal corresponding to the bit. Thus, the first terminal device may determine activating or deactivating one or more pieces of resource allocation information for sending the cross link interference measurement signal based on the value of the specific bit in the received MAC CE signaling.

It should be noted that the above examples are illustrative only and are not intended to be a limitation of the specific contents of resource allocation information for sending the cross link interference measurement signal, the value of the bit in the MAC CE signaling and a corresponding relationship between the specific contents of resource allocation information and the value of the bit in the embodiments of the disclosure.

At step 93, third indication information is received based on DCI. The third indication information is configured to indicate the first terminal device to trigger one or more pieces of the resource allocation information for sending the cross link interference measurement signal.

For example, a specific bit may be added in the DCI, and the added bit represents the third indication information.

Optionally, it may be agreed in the protocol that, when the value of the added bit in the DCI is 1, it indicates triggering the resource allocation information for sending the cross link interference measurement signal corresponding to the bit. Thus, the first terminal device may determine triggering the corresponding resource allocation information for sending the cross link interference measurement signal based on the value of the specific bit in the received DCI.

It should be noted that the above examples are illustrative only and are not intended to be a limitation of the specific contents of resource allocation information for sending the cross link interference measurement signal, the value of the bit in the DCI and a corresponding relationship between the specific contents of resource allocation information and the value of the bit in the embodiments of the disclosure.

By implementing the embodiments of the disclosure, the first network device may receive the first indication information based on the RRC signaling to determine the resource allocation information for sending the cross link interference measurement signal, may determine activating or deactivating the resource allocation information for sending the cross link interference measurement signal based on the indication of the MAC CE signaling, and may further determine triggering the resource allocation information for sending the cross link interference measurement signal based on the indication of the DCI, so that the first terminal device may perform the full duplex communication based on the obtained resource allocation information, thus reducing the interference during the full duplex communication process of the terminal device as much as possible, and improving the quality and the efficiency of communication transmission.

As illustrated in FIG. 10, FIG. 10 is a flowchart illustrating a communication method according to an embodiment of the disclosure. The method is performed by a second terminal device. As illustrated in FIG. 10, the method may include but not limited to the following step.

At step 101, first indication information is received. The first indication information is configured to indicate resource allocation information for processing a cross link interference measurement signal to the second terminal device.

In general, the network device may perform the full duplex communication based on full duplex communication information supported by the network device itself. However, when the terminal device performs the full duplex communication, there may be a self-interference and a mutual interference between adjacent terminal devices, which may cause an interference on the communication transmission and affect the quality and the efficiency of communication transmission.

In the embodiments of the disclosure, the second terminal device may obtain resource allocation information for processing the cross link interference measurement signal based on the received first indication information from the network device. Thus, the second terminal device may perform the full duplex communication based on the obtained resource allocation information, thus reducing the interference during the full duplex communication process of the terminal device as much as possible, and improving the quality and the efficiency of communication transmission.

Optionally, the first indication information may include at least one of: time-frequency domain resource allocation information for measuring the cross link interference measurement signal; time-frequency domain resource allocation information for receiving the cross link interference measurement signal; a receiving beam group for receiving the cross link interference measurement signal; or, a reporting threshold for a number of cross link interference measurements.

It needs to be noted that, the specific contents and implementations of the first indication information may refer to descriptions of other embodiments, which are not limited in the disclosure.

Optionally, the cross link interference measurement signal includes at least one of: a PUSCH signal; a PUCCH signal; an SRS; or a specified cross link interference measurement signal.

It needs to be noted that, the specific contents and implementations of the cross link interference measurement signal may refer to descriptions of other embodiments of the disclosure, which are not repeated here.

Optionally, the cross link interference measurement signal may be received by using a receiving beam of the PDCCH.

For example, it is agreed in the protocol that or the network device configures that, the receiving beam of the PDCCH is a beam 1, in which case the second terminal device may receive the cross link interference measurement signal via the beam 1.

Optionally, the cross link interference measurement signal may be received by using a receiving beam of the PDSCH.

For example, it is agreed in the protocol that or the network device configures that, the receiving beam of the PDSCH is a beam 3, in which case the second terminal device may receive the cross link interference measurement signal via the beam 3.

Optionally, the cross link interference measurement signal may be received by using a receiving beam configured by the network device.

For example, the receiving beam configured by the network device is a beam 4, in which case the second terminal device may receive the cross link interference measurement signal via the beam 4.

It should be noted that the above examples are illustrative only and are not intended to be a limitation of the beam for receiving the cross link interference measurement signal in the embodiments of the disclosure.

By implementing the embodiments of the disclosure, the second terminal device may obtain resource allocation information for processing the cross link interference measurement signal based on the indication of the first indication information. Thus, the terminal device may perform the full duplex communication based on the obtained resource allocation information, thus reducing the interference during the full duplex communication process of the terminal device as much as possible, and improving the quality and the efficiency of communication transmission.

Figures 11, 12:
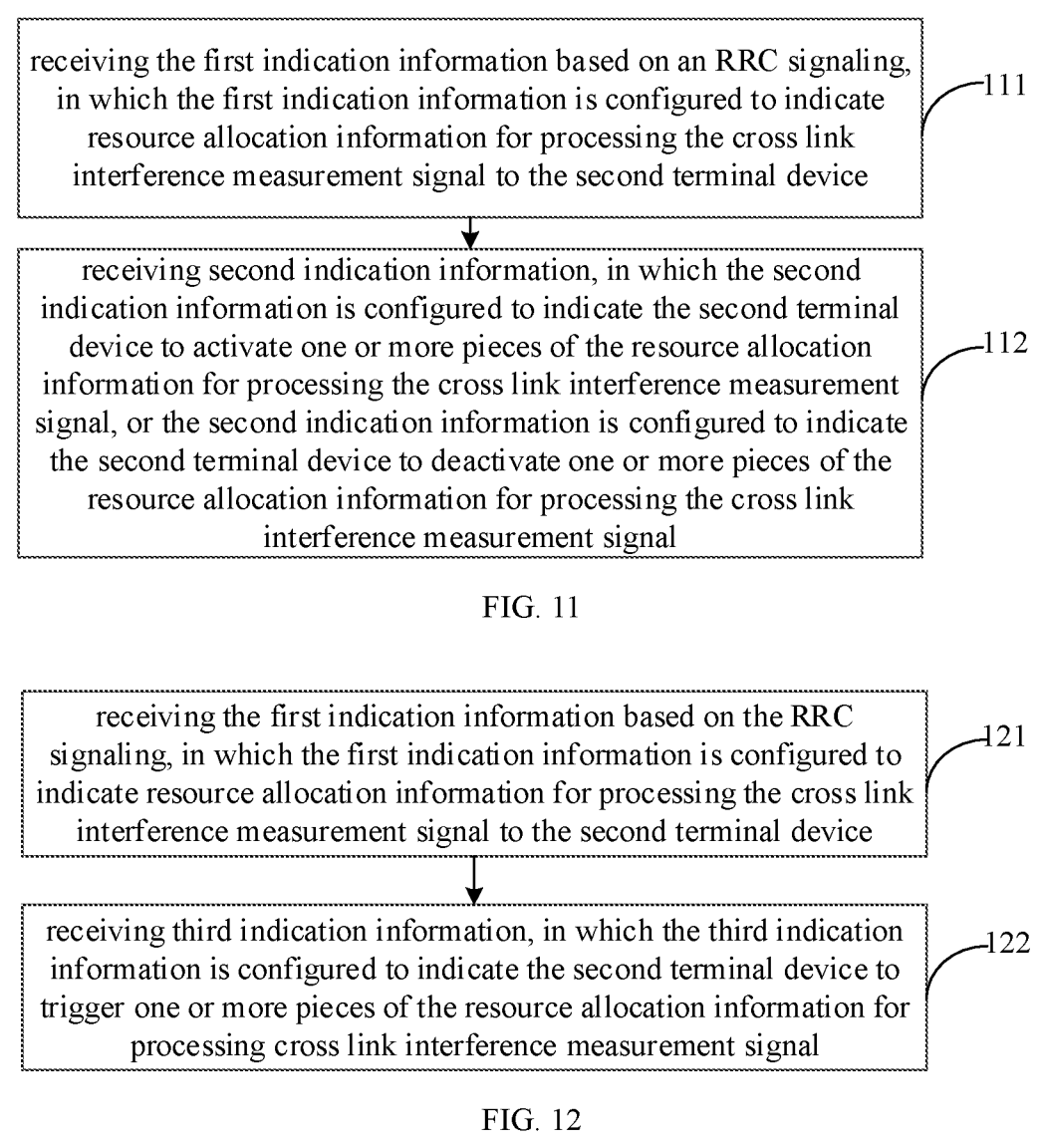

As illustrated in FIG. 11, FIG. 11 is a flowchart illustrating a communication method according to an embodiment of the disclosure. The method is performed by a second terminal device. As illustrated in FIG. 11, the method may include but not limited to the following steps.

At step 111, the first indication information is received based on the RRC signaling. The first indication information is configured to indicate the resource allocation information for processing the cross link interference measurement signal to the second terminal device.

It needs to be noted that, the specific contents and implementations of the first indication information may refer to descriptions of other embodiments, which are not limited in the disclosure.

It needs to be noted that, the specific contents and implementations of step 111 may refer to descriptions of other embodiments, which are not repeated here.

At step 112, second indication information is received. The second indication information is configured to indicate the second terminal device to activate one or more pieces of the resource allocation information for processing the cross link interference measurement signal, or the second indication information is configured to indicate the second terminal device to deactivate one or more pieces of the resource allocation information for processing the cross link interference measurement signal.

It needs to be noted that, the specific contents and implementations of the resource allocation information for processing the cross link interference measurement signal may refer to descriptions of other embodiments of the disclosure, which are not repeated here.

It needs to be noted that, the specific contents and implementations of step 112 may refer to descriptions of other embodiments, which are not repeated here.

By implementing the embodiments of the disclosure, the second network device may receive the first indication information based on the RRC signaling to obtain the resource allocation information for processing the cross link interference measurement signal, and may further determine activating or deactivating the resource allocation information for processing the cross link interference measurement signal based on the indication of the received second indication information, so that the second terminal device may perform the full duplex communication based on the obtained resource allocation information, thus reducing the interference during the full duplex communication process of the terminal device as much as possible, and improving the quality and the efficiency of communication transmission.

As illustrated in FIG. 12, FIG. 12 is a flowchart illustrating a communication method according to an embodiment of the disclosure. The method is performed by a second terminal device. As illustrated in FIG. 12, the method may include but not limited to the following steps.

At step 121, the first indication information is received based on the RRC signaling. The first indication information is configured to indicate resource allocation information for processing the cross link interference measurement signal to the second terminal device.

It needs to be noted that, the specific contents and implementations of the first indication information may refer to descriptions of other embodiments, which are not limited in the disclosure.

It needs to be noted that, the specific contents and implementations of step 121 may refer to descriptions of other embodiments, which are not repeated here.

At step 122, third indication information is received. The third indication information is configured to indicate the second terminal device to trigger one or more pieces of the resource allocation information for processing cross link interference measurement signal.

It needs to be noted that, the specific contents and implementations of the resource allocation information for processing the cross link interference measurement signal may refer to descriptions of other embodiments of the disclosure, which are not repeated here.

It needs to be noted that, the specific contents and implementations of step 122 may refer to descriptions of other embodiments, which are not repeated here.

By implementing the embodiments of the disclosure, the second terminal device may receive the first indication information based on the RRC signaling to obtain the resource allocation information for processing the cross link interference measurement signal, and may further obtain triggering the resource allocation information for processing the cross link interference measurement signal based on the indication of the received third indication information, so that the full duplex communication may be performed based on the obtained resource allocation information, thus reducing the interference during the full duplex communication process of the terminal device as much as possible, and improving the quality and the efficiency of communication transmission.

As illustrated in FIG. 13, FIG. 13 is a flowchart illustrating a communication method according to an embodiment of the disclosure. The method is performed by a second terminal device. As illustrated in FIG. 13, the method may include but not limited to the following steps.

At step 131, the first indication information is received based on the RRC signaling. The first indication information is configured to indicate the resource allocation information for processing the cross link interference measurement signal to the second terminal device.

It needs to be noted that, the specific contents and implementations of the first indication information may refer to descriptions of other embodiments, which are not limited in the disclosure.

It needs to be noted that, the specific contents and implementations of step 131 may refer to descriptions of other embodiments, which are not repeated here.

At step 132, second indication information is received based on the MAC CE signaling. The second indication information is configured to indicate the second terminal device to activate one or more pieces of the resource allocation information for processing the cross link interference measurement signal, or the second indication information is configured to indicate the second terminal device to deactivate one or more pieces of the resource allocation information for processing the cross link interference measurement signal.

It needs to be noted that, the specific contents and implementations of the resource allocation information for processing the cross link interference measurement signal may refer to descriptions of other embodiments of the disclosure, which are not repeated here.

It needs to be noted that, the specific contents and implementations of step 131 may refer to descriptions of other embodiments, which are not repeated here.

At step 133, third indication information is received based on the DCI. The third indication information is configured to indicate the second terminal device to trigger one or more pieces of the resource allocation information for processing the cross link interference measurement signal.

It needs to be noted that, the specific contents and implementations of step 133 may refer to descriptions of other embodiments, which are not repeated here.

By implementing the embodiments of the disclosure, the second network device may receive the first indication information based on the RRC signaling to determine triggering the resource allocation information of the cross link interference measurement signal, may determine activating or deactivating the resource allocation information for processing the cross link interference measurement signal based on the indication of the MAC CE signaling, and may further determine triggering the resource allocation information for processing the cross link interference measurement signal based on the indication of the DCI, so that the second terminal device may perform the full duplex communication based on the obtained resource allocation information, thus reducing the interference during the full duplex communication process of the terminal device as much as possible, and improving the quality and the efficiency of communication transmission.

In the embodiments according to the disclosure, the methods according to the embodiments of the disclosure are introduced mainly from the perspective of the network device, the first terminal device and the second terminal device. To achieve various functions in the methods according to the embodiments of the disclosure, the network device, the first terminal device and the second terminal device may include a hardware structure and a software module, to achieve the above functions in the form of the hardware structure, or the software module or a combination of the hardware structure and the software module. The certain function in the above functions may be performed by the hardware structure, the software module or a combination of the hardware structure and the software module.

As illustrated in FIG. 14, FIG. 14 is a structural diagram illustrating a communication apparatus 140 according to an embodiment of the disclosure. The communication apparatus 140 as illustrated in FIG. 14 may include a transceiving module 1401.

The transceiving module 1401 may include a sending module and/or a receiving module. The sending module is configured to implement a sending function, the receiving module is configure to implement a receiving function, and the transceiving module 1401 may implement the sending function and/or the receiving function.

It may be understood that the communication apparatus 140 may be a network device, an apparatus in the network device, or an apparatus capable of being used with the network device.

The communication apparatus 140 includes a transceiving module 1401. The transceiving module 1401 is configured to send first indication information. The first indication information is configured to indicate resource allocation information for processing a cross link interference measurement signal to a terminal device.

Optionally, the first indication information includes at least one of: time-frequency domain resource allocation information for sending the cross link interference measurement signal; a sending beam group for sending the cross link interference measurement signal; time-frequency domain resource allocation information for measuring the cross link interference measurement signal; time-frequency domain resource allocation information for receiving the cross link interference measurement signal; a receiving beam group for receiving the cross link interference measurement signal; or, a reporting threshold for a number of cross link interference measurements.

Optionally, the cross link interference measurement signal includes at least one of: a PUSCH signal; a PUCCH signal; an SRS; or a specified cross link interference measurement signal.

Optionally, the sending beam group for sending the cross link interference measurement signal is indicated by any one of: a specified set of SSBs, or a specified set of CSI RSs.

Optionally, the transceiving module 1401 is specifically configured to: send the first indication information based on an RRC signaling.

Optionally, the transceiving module 1401 is further configured to: send second indication information. The second indication information is configured to indicate the terminal device to activate one or more pieces of the resource allocation information for processing the cross link interference measurement signal, or the second indication information is configured to indicate the terminal device to deactivate one or more pieces of the resource allocation information for processing the cross link interference measurement signal.

Optionally, the transceiving module 1401 is further specifically configured to: send the second indication information based on an MAC CE.

Optionally, the transceiving module 1401 is further configured to: send third indication information. The third indication information is configured to indicate the terminal device to trigger one or more pieces of the resource allocation information for processing the cross link interference measurement signal.

Optionally, the transceiving module 1401 is further specifically configured to: send the third indication information based on DCI.

The communication apparatus according to the disclosure indicates resource allocation information for processing the cross link interference measurement signal to the terminal device, so that the terminal device may perform the full duplex communication based on the obtained resource allocation information, thus reducing the interference during the full duplex communication process of the terminal device as much as possible, and improving the quality and the efficiency of communication transmission.

It may be understood that the communication apparatus 140 may be a first terminal device, an apparatus in the first terminal device, or an apparatus capable of being used with the first terminal device.

The communication apparatus 140 includes a transceiving module 1401. The transceiving module 1401 is configured to receive first indication information. The first indication information is configured to indicate resource allocation information for sending a cross link interference measurement signal to the apparatus.

Optionally, the first indication information includes at least one of: time-frequency domain resource allocation information for sending the cross link interference measurement signal; or a sending beam group for sending the cross link interference measurement signal.

Optionally, the cross link interference measurement signal includes at least one of: a PUSCH signal; a PUCCH signal; an SRS; or a specified cross link interference measurement signal.

Optionally, the sending beam group for sending the cross link interference measurement signal is indicated by any one of: a specified set of SSBs, or a specified set of CSI RSs.

Optionally, the apparatus 140 further includes a processing module. The processing module is configured to determine an uplink beam corresponding to an optimal receiving beam in a specified set of SSBs is a sending beam of the cross link interference measurement signal; or, the processing module is further configured to determine an uplink beam corresponding to an optimal receiving beam in a specified set of CSI RSs is a sending beam of the cross link interference measurement signal.

Optionally, the transceiving module 1401 is specifically configured to: receive the first indication information based on an RRC signaling.

Optionally, the transceiving module 1401 is further configured to: receive second indication information. The second indication information is configured to indicate the apparatus to activate one or more pieces of the resource allocation information for sending the cross link interference measurement signal, or the second indication information is configured to indicate the apparatus to deactivate one or more pieces of the resource allocation information for sending the cross link interference measurement signal.

Optionally, the transceiving module 1401 is further specifically configured to: receive the second indication information based on an MAC CE.

Optionally, the transceiving module 1401 is further configured to: receive third indication information. The third indication information is configured to indicate the apparatus to trigger one or more pieces of the resource allocation information for sending the cross link interference measurement signal.

Optionally, the transceiving module 1401 is further specifically configured to: receive the third indication information based on DCI.

The communication apparatus according to the disclosure may obtain resource allocation information for sending the cross link interference measurement signal based on the indication of the first indication information. Thus, the full duplex communication may be performed based on the obtained resource allocation information, thus reducing the interference during the full duplex communication process of the terminal device as much as possible, and improving the quality and the efficiency of communication transmission.

It may be understood that the communication apparatus 140 may be a second terminal device, an apparatus in the second terminal device, or an apparatus capable of being used with the second terminal device.

The communication apparatus 140 includes a transceiving module 1401. The transceiving module 1401 is configured to receive first indication information. The first indication information is configured to indicate resource allocation information for processing a cross link interference measurement signal to the apparatus.

Optionally, the first indication information includes at least one of: time-frequency domain resource allocation information for measuring the cross link interference measurement signal; time-frequency domain resource allocation information for receiving the cross link interference measurement signal; a receiving beam group for receiving the cross link interference measurement signal; or, a reporting threshold for a number of cross link interference measurements.

Optionally, the cross link interference measurement signal includes at least one of: a PUSCH signal; a PUCCH signal; an SRS; or a specified cross link interference measurement signal.

Optionally, the transceiving module 1401 is further configured to: receive the cross link interference measurement signal by using a receiving beam of a PDCCH; or, receive the cross link interference measurement signal by using a receiving beam of a PDSCH; or, receive the cross link interference measurement signal by using a receiving beam configured by a network device.

Optionally, the transceiving module 1401 is specifically configured to: receive the first indication information based on an RRC signaling.

Optionally, the transceiving module 1401 is further configured to: receive second indication information. The second indication information is configured to indicate the apparatus to activate one or more pieces of the resource allocation information for processing the cross link interference measurement signal, or the second indication information is configured to indicate the apparatus to deactivate one or more pieces of the resource allocation information for processing the cross link interference measurement signal.

Optionally, the transceiving module 1401 is further specifically configured to: receive the second indication information based on an MAC CE signaling.

Optionally, the transceiving module 1401 is further configured to: receive third indication information. The third indication information is configured to indicate the apparatus to trigger one or more pieces of the resource allocation information for processing cross link interference measurement signal.

Optionally, the transceiving module 1401 is further specifically configured to: receive the third indication information based on DCI.

The communication apparatus according to the disclosure may obtain the resource allocation information for processing the cross link interference measurement signal based on the indication of the first indication information. Thus, the full-duplex communication may be performed based on the obtained resource allocation information, thus reducing the interference during the full-duplex communication process of the terminal device as much as possible, and improving the quality and the efficiency of communication transmission.

As illustrated in FIG. 15, FIG. 15 is a structural diagram illustrating another communication device 150 according to an embodiment of the disclosure. The communication device 150 may be a first terminal device, or a second terminal device, or a chip, a system on chip, a processor or the like that supports the network device to implement the method, or a chip, a system on chip, a processor or the like that supports the first terminal device to implement the method, or a chip, a system on chip, a processor or the like that supports the second terminal device to implement the method, etc. The device may be configured to implement the method described in the method embodiments, and may refer to descriptions in the method embodiments.

The communication device 150 may include one or more processors 1501. The processor 1501 may include a general purpose processor or a dedicated processor, for example, a baseband processor or a central processor. The baseband processor may be configured to process a communication protocol and communication data, and the central processor may be configured to control a communication device (e.g., a base station, a baseband chip, a terminal device, a terminal device chip, a DU or CU, etc.), to execute a computer program, and process data of the computer program.

Optionally, the communication device 150 may further include one or more memories 1502 stored with a computer program 1504. The processor 1501 executes the computer program 1504 so that the communication device 150 performs the methods as described in the above method embodiments. Optionally, the memory 1502 may further store data. The communication device 150 and the memory 1502 may be independently configured or integrated together.

Optionally, the communication device 150 may further include a transceiver 1505 and an antenna 1506. The transceiver 1505 may be referred to as a transceiving unit, a transceiver, a transceiving circuit or the like, which may be configured to achieve a transceiving function. The transceiver 1505 may include a receiver and a sender. The receiver may be referred to as a receiver or a receiving circuit, etc., for implementing a receiving function; the sender may be referred to as a sender or a sending circuit, etc. for implementing a sending function.

Optionally, the communication device 150 may further include one or more interface circuits 1507. The interface circuit 1507 is configured to receive code instructions and send the code instructions to the processor 1501. The processor 1501 runs the code instructions so that the communication device 150 performs the methods as described in the above method embodiments.

When the communication device 150 is a network device, the transceiver 1505 is configured to perform step 21 in FIG. 2; step 31 in FIG. 3; step 32 in FIG. 3; step 41 in FIG. 4; step 42 in FIG. 4; step 51 in FIG. 5; step 52 in FIG. 5 or step 53 in FIG. 5.

When the communication device 150 is a first network device, the transceiver 1505 is configured to perform step 61 in FIG. 6; step 71 in FIG. 7; step 72 in FIG. 7; step 81 in FIG. 8; step 82 in FIG. 8; step 91 in FIG. 9; step 92 in FIG. 9 or step 93 in FIG. 9.

When the communication device 150 is a second network device, the transceiver 1505 is configured to perform step 101 in FIG. 10; step 111 in FIG. 11; step 112 in FIG. 11; step 121 in FIG. 12; step 122 in FIG. 12; step 131 in FIG. 13; step 132 in FIG. 13 or step 133 in FIG. 13.

In an implementation, the processor 1501 may include a transceiver configured to implement receiving and sending functions. For example, the transceiver may be a transceiving circuit, or an interface, or an interface circuit. The transceiving circuit, the interface or the interface circuit configured to implement receiving and sending functions may be separate or integrated together. The transceiving circuit, the interface or the interface circuit may be configured to read and write codes/data, or the transceiving circuit, the interface or the interface circuit may be configured to transmit or deliver a signal.

In an implementation, the processor 1501 may be stored with a computer program 1503. The computer program 1503 is running on the processor 1501 so that the communication device 150 performs the methods as described in the above method embodiments. The computer program 1503 may be solidified in the processor 1501, in which case the processor 1501 may be implemented in hardware.

In an implementation, the communication device 150 may include a circuit that may implement a sending or receiving or communication function in the above method embodiments. The processor and the transceiver described in the disclosure may be implemented on integrated circuits (ICs), analog ICs, radio frequency integrated circuits (RFICs), mixed signal ICs, application specific integrated circuits (ASICs), printed circuit boards (PCBs), electronic devices, etc. The processor and the transceiver may further be fabricated by using various IC process technologies, such as complementary metal oxide semiconductor (CMOS), nMetal-oxide-semiconductor (NMOS), positive channel metal oxide semiconductor (PMOS), bipolar junction transistor (BJT), bipolar CMOS (BiCMOS), silicon germanium (SiGe) and gallium arsenide (GaAs), etc.

The communication device described in the above embodiments may be a network device, but the scope of the communication device described in the disclosure is not limited to the network device, and a structure of the communication device may not be limited to FIG. 15. The communication device may be a stand-alone device or may be a part of a large device. For example, the communication device may be:

(1) a stand-alone integrated circuit (IC), or a chip, or a system on chip or a subsystem;

(2) a set of one or more ICs, optionally, which may also include a storage component for storing data and a computer program;

(3) an ASIC, such as a Modem;

(4) a module that may be embedded within other devices;

(5) a receiver, a terminal device, a smart terminal device, a cellular phone, a wireless device, a handset, a mobile unit, a vehicle device, a network device, a cloud device, an artificial intelligence device, etc.; and (6) others, and so forth.

Figure 16:
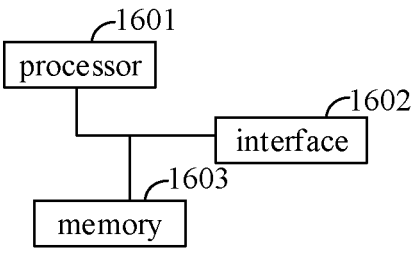
FIG. 16 is a structural diagram illustrating a chip according to an embodiment of the disclosure.

In the case that the communication device may be a chip or a system on chip, please refer to a structural diagram of a chip as illustrated in FIG. 16. The chip illustrated in FIG. 16 may include a processor 1601 and an interface 1602. There may be one or more processors 1601, and there may be a plurality of interfaces 1602.

In the case that the chip is configured to implement the function of the network device in the embodiments of the disclosure, the interface 1602 is configured to perform step 21 in FIG. 2; step 31 in FIG. 3; step 32 in FIG. 3; step 41 in FIG. 4; step 42 in FIG. 4; step 51 in FIG. 5; step 52 in FIG. 5; step 61 in FIG. 6 or step 62 in FIG. 6.

In the case that the chip is configured to implement the function of the first terminal device in the embodiments of the disclosure, the interface 1602 is configured to perform step 61 in FIG. 6; step 71 in FIG. 7; step 72 in FIG. 7; step 81 in FIG. 8; step 82 in FIG. 8; step 91 in FIG. 9; step 92 in FIG. 9 or step 93 in FIG. 9.

In the case that the chip is configured to implement a function of a second terminal device in the embodiments of the disclosure, the interface 1602 is configured to perform step 101 in FIG. 10; step 111 in FIG. 11; step 112 in FIG. 11;

step 121 in FIG. 12; step 122 in FIG. 12; step 131 in FIG. 13; step 132 in FIG. 13 or step 133 in FIG. 13.

Optionally, the chip further includes a memory 1603. The memory 1603 is configured to store a necessary computer program and data.

Those skilled in the related art may understand that, various illustrative logical blocks and steps listed in the embodiments of the disclosure, may be implemented in electronic hardware, computer software or a combination of the electronic hardware and the computer software. Whether the function is implemented by the hardware or the software depends on specific applications and design requirements for an overall system. Those skilled in the art may implement the functions by using various methods for each specific application, but such an implementation should not be understood as going beyond the protection scope of the embodiments of the disclosure.

A communication system is further according to an embodiment of the disclosure. The system includes a communication apparatus serving as a network device in the embodiment of FIG. 14, or the system includes a communication device serving as a network device in the embodiment of FIG. 15.

A computer-readable storage medium stored with instructions is further provided in the disclosure. When the instructions are executed, functions of the any one method embodiment are implemented.

A computer program product is further provided in the disclosure. The computer program product implements functions of the above any one method embodiment when executed by a processor.

In the above embodiments, it may be fully or partially implemented in software, hardware, firmware, or any combination. When implemented in software, it may be fully or partially implemented in the form of a computer program product. The computer program product includes one or more computer programs. The procedures or functions according to an embodiment of the disclosure are fully or partially generated when the computer programs are loaded and executed on a computer. The computer may be a general purpose computer, a special purpose computer, a computer network, or other programmable device. The computer program may be stored in a computer-readable storage medium or sent from one computer-readable storage medium to another computer-readable storage medium. For example, the computer program may be sent from one website, computer, server, or data center to another website, computer, server, or data center via wire (such as a coaxial cable, a fiber optic, a digital subscriber line (DSL)) or wireless (such as infrared, wireless, microwave). The computer-readable storage medium may be any available medium that may be accessed by a computer or a data storage device such as a server a data center, etc. that integrates one or more of the available media. The available medium may be a magnetic medium (such as a floppy disk, a hard disk and a magnetic tape), an optical medium (such as a digital video disk (DVD)), or a semiconductor medium (such as a solid state disk (SSD)), etc.

Those skilled in the art may understand that various numbers such as first and second involved in the disclosure are distinguished merely for convenience of description, and are not intended to limit the scope of embodiments of the disclosure, but also to indicate an order of precedence.

The term "at least one" in the disclosure may also be described as one or more, and "a plurality of" may be two, three, four or more, which is not limited in the disclosure. In the embodiments of the disclosure, for a kind of technical feature, technical features in the kind of technical feature are distinguished by "first", "second", "third", "A", "B", "C" and "D", and there is no order of precedence or magnitude between the technical features described in "first", "second", "third", "A", "B", "C" and "D".

The corresponding relationships indicated by tables in the disclosure may be configured or predefined. The values of information in tables are only examples, and may be configured as other values, which are not limited in the disclosure. When the corresponding relationships between information and parameters are configured, it is not always necessary to configure all the corresponding relationships indicated in tables. For example, in the tables of the disclosure, the corresponding relationships indicated by some rows may not be configured. For another example, appropriate transformations and adjustments, such as splitting and merging, may be made based on the above tables. The names of parameters shown in headers in the tables may be other names that may be understood by the communication apparatus, and the values or representations of the parameters may be other values or representations that may be understood by the communication apparatus. When the above tables are implemented, other data structures may be used, for example, arrays, queues, containers, stacks, linear lists, pointers, linked lists, trees, graphs, structures, classes, heaps or hash tables.

Predefinition in the disclosure may be understood as definition, pre-definition, storage, pre-storage, pre-negotiation, pre-configuration, solidification or pre-burning.

Those skilled in the related art may realize that, the units and algorithm steps of the examples described in conjunction with the embodiments of the disclosure may be implemented by electronic hardware or a combination of the electronic hardware and the computer software. Whether the functions are executed by the hardware or the software depends on a specific application and a design constraint of the technical solution. Those skilled in the art may adopt different methods for each specific application to implement the described functions, but such implementation should not be considered as going beyond the scope of the disclosure.

Those skilled in the art may clearly understand that, for the convenience and simplicity of description, a specific working process of the system, the apparatus/device and the unit described above may refer to a corresponding process in the above method embodiments, which will not be repeated here.

The above are only implementations of the disclosure. However, the protection scope of the disclosure is not limited here. Changes and substitutions that may be easily considered by those skilled in the art shall be contained within the protection scope of the disclosure. Therefore, the protection scope of the disclosure shall be determined by the protection scope of claims.

What is claimed is:

1. A communication method, performed by a network device, the method comprising:
    sending first indication information based on a radio resource control (RRC) signaling, wherein the first indication information is configured to indicate resource allocation information for processing a cross link interference measurement signal to a terminal device;
    sending second indication information based on a media access control (MAC) control element (CE), wherein the second indication information is configured to indicate the terminal device to activate one or more pieces of the resource allocation information for processing the cross link interference measurement signal, or the second indication information is configured to indicate the terminal device to deactivate one or more pieces of the resource allocation information for processing the cross link interference measurement signal; and sending third indication information based on downlink control information (DCI), wherein the third indication information is configured to indicate the terminal device to trigger one or more pieces of the resource allocation information for processing the cross link interference measurement signal.

2. The method according to claim 1, wherein the first indication information comprises at least one of:

time-frequency domain resource allocation information for sending the cross link interference measurement signal;

a sending beam group for sending the cross link interference measurement signal;

time-frequency domain resource allocation information for measuring the cross link interference measurement signal;

time-frequency domain resource allocation information for receiving the cross link interference measurement signal;

a receiving beam group for receiving the cross link interference measurement signal; or, a reporting threshold for a number of cross link interference measurements;

wherein the cross link interference measurement signal comprises at least one of: a physical uplink shared channel (PUSCH) signal; a physical uplink control channel (PUCCH) signal; a sounding reference signal (SRS); or a specified cross link interference measurement signal; and wherein the sending beam group for sending the cross link interference measurement signal is indicated by any one of: a specified set of synchronization signal blocks (SSBs), or a specified set of channel state information (CSI) reference signals (RSs).

3. A communication method, performed by a first terminal device, the method comprising:

receiving first indication information based on a radio resource control (RRC) signaling, wherein the first indication information is configured to indicate resource allocation information for sending a cross link interference measurement signal to the first terminal device;

receiving second indication information based on a media access control (MAC) control element (CE), wherein the second indication information is configured to indicate the first terminal device to activate one or more pieces of the resource allocation information for sending the cross link interference measurement signal, or the second indication information is configured to indicate the first terminal device to deactivate one or more pieces of the resource allocation information for sending the cross link interference measurement signal; and receiving third indication information based on downlink control information (DCI), wherein the third indication information is configured to indicate the first terminal device to trigger one or more pieces of the resource allocation information for sending the cross link interference measurement signal.

4. The method according to claim 3, wherein the first indication information comprises at least one of:

time-frequency domain resource allocation information for sending the cross link interference measurement signal; or a sending beam group for sending the cross link interference measurement signal;

wherein the cross link interference measurement signal comprises at least one of: a physical uplink shared channel (PUSCH) signal; a physical uplink control channel (PUCCH) signal; a sounding reference signal (SRS); or a specified cross link interference measurement signal; and wherein the sending beam group for sending the cross link interference measurement signal is indicated by any one of: a specified set of synchronization signal blocks (SSBs), or a specified set of channel state information (CSI) reference signals (RSS).

5. The method according to claim 4, further comprising one of:

determining an uplink beam corresponding to an optimal receiving beam in the specified set of SSB as a sending beam of the cross link interference measurement signal; or, determining an uplink beam corresponding to an optimal receiving beam in a specified set of CSI RSs as a sending beam of the cross link interference measurement signal.

6. A communication method, performed by a second terminal device, comprising:

receiving first indication information based on a radio resource control (RRC) signaling, wherein the first indication information is configured to indicate resource allocation information for processing a cross link interference measurement signal to the second terminal device;

receiving second indication information based on a media access control (MAC) control element (CE), wherein the second indication information is configured to indicate the second terminal device to activate one or more pieces of the resource allocation information for processing the cross link interference measurement signal, or the second indication information is configured to indicate the second terminal device to deactivate one or more pieces of the resource allocation information for processing the cross link interference measurement signal; and receiving third indication information based on downlink control information (DCI), wherein the third indication information is configured to indicate the second terminal device to trigger one or more pieces of the resource allocation information for processing the cross link interference measurement signal.

7. The method according to claim 6, wherein the first indication information comprises at least one of:

time-frequency domain resource allocation information for measuring the cross link interference measurement signal;

time-frequency domain resource allocation information for receiving the cross link interference measurement signal;

a receiving beam group for receiving the cross link interference measurement signal; or, a reporting threshold for a number of cross link interference measurements; and wherein the cross link interference measurement signal comprises at least one of: a physical uplink shared channel (PUSCH) signal; a physical uplink control channel (PUCCH) signal; a sounding reference signal (SRS); or a specified cross link interference measurement signal.

8. The method according to claim 7, further comprising one of:

receiving the cross link interference measurement signal by using a receiving beam of a physical downlink control channel (PDCCH); or, receiving the cross link interference measurement signal by using a receiving beam of a physical downlink shared channel (PDSCH); or, receiving the cross link interference measurement signal by using a receiving beam configured by a network device.

\* \* \* \* \*